（12）United States Patent
Badrinath et al.

(10) Patent No.: US 11,943,108 B2
(45) Date of Patent: Mar. 26, 2024

(54) SERVICE LEVEL AGREEMENT MAINTENANCE IN TELECOM NETWORKS

(71) Applicant: Telefonaktiebolaget LM Ericsson (publ), Stockholm (SE)

(72) Inventors: Ramamurthy Badrinath, Bangalore Karnataka (IN); Anusha Pradeep Mujumdar, Bangalore (IN); Vijaya Yajnanarayana, Bangalore (IN); Ankit Jauhari, Bangalore (IN); Senthamiz Selvi Arumugam, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/800,548

(22) PCT Filed: Feb. 20, 2020

(86) PCT No.: PCT/IN2020/050156
§ 371 (c)(1),
(2) Date: Aug. 18, 2022

(87) PCT Pub. No.: WO2021/165976
PCT Pub. Date: Aug. 26, 2021

(65) Prior Publication Data
US 2023/0083063 A1 Mar. 16, 2023

(51) Int. Cl.
*H04L 41/0823* (2022.01)
*H04L 41/0894* (2022.01)
(Continued)

(52) U.S. Cl.
CPC ...... *H04L 41/0823* (2013.01); *H04L 41/0894* (2022.05); *H04L 41/40* (2022.05); *H04L 41/5009* (2013.01); *H04L 41/5054* (2013.01)

(58) Field of Classification Search
CPC ............ H04L 41/0823; H04L 41/5009; H04L 41/147; H04L 41/149; H04L 43/0876; H04L 43/16
See application file for complete search history.

(56) References Cited

U.S. PATENT DOCUMENTS 7,145,871 B2 12/2006 Levy et al.
8,745,216 B2 6/2014 Pasala et al.
(Continued)

FOREIGN PATENT DOCUMENTS

WO 2019025944 A1 2/2019

OTHER PUBLICATIONS

Fallon, Liam, "The ONAP Policy Framework", Section 2.2.2 Policy Design, <https://wiki.onap.org/display/DW/The+ONAP+Policy+Framework>, 2019, pp. 1-4.

*Primary Examiner* — Joe Chacko
(74) *Attorney, Agent, or Firm* — Murphy, Bilak & Homiller, PLLC

(57) ABSTRACT

A method for operating a telecom network having an SLA agreement is disclosed. The method comprises obtaining annotated alarm data comprising an indication of a threshold crossing of at least one state variable of the telecom network defined by the SLA. The annotated alarm data further comprises an indication of a desired value of the at least one state variable of the telecom network. Moreover, the method comprises determining a desired state of the telecom network based on the desired value of at least one state variable, and selecting a set of policy actions from a policy action bank. The policy action bank comprises a plurality of policy actions, where each policy action is associated with at least one estimated action effect. The selection of the set of policy actions is accordingly based on the estimated action effects of the plurality of policy actions and on the determined desired state of the telecom network such that the desired (Continued)

state is reachable upon execution of the selected set of policy actions. The method further comprises sending the selected set of policy actions to an action orchestrating module for execution of the selected set of policy actions. Moreover, a corresponding computer program product and system are disclosed.

6 Claims, 4 Drawing Sheets

(51) Int. Cl.
   *H04L 41/40*  (2022.01)
   *H04L 41/5009*  (2022.01)
   *H04L 41/5054*  (2022.01)

(56) References Cited

U.S. PATENT DOCUMENTS

| | | | |
|---|---|---|---|
| 9,049,123 B2 * | 6/2015 | Kaminsky | H04L 41/0894 |
| 2013/0132561 A1 | 5/2013 | Pasala et al. | |
| 2016/0300142 A1 * | 10/2016 | Feller | G06N 20/00 |
| 2019/0102717 A1 * | 4/2019 | Wu | H04L 41/147 |

* cited by examiner

SERVICE LEVEL AGREEMENT MAINTENANCE IN TELECOM NETWORKS

TECHNICAL FIELD

The present disclosure relates to methods and systems for operating a telecom network having a Service Level Agreement (SLA). More particularly, the present disclosure relates to SLA maintenance in telecom networks.

BACKGROUND

In a telecom infrastructure it is important to constantly monitor traffic flows to detect any violation of Service Level Agreements (SLAs). In a modern telecom system, different flows may be provisioned as independent network slices each with its own SLA. In response to an alarm indicating a serious SLA degradation it is important to quickly act to restore the SLA. This is often referred to as service assurance or SLA assurance. The set of actions that are triggered in response to the alarm are called policies or policy actions. Example policies include rebooting a network function, server or switch.

Currently known methods for SLA assurance operate by maintaining the policy actions in an ordered list. Meaning that each alarm is mapped to a certain index in the ordered list, and once an alarm is raised, one by one the policies starting from the mapped index of that alarm are executed in the list of policy actions until the alarm is resolved. The entity or system that performs the mapping is often referred to as a policy engine.

Such methods for SLA assurance may be considered simplistic and static. Moreover, the actions are broadly identified, and not particularly specific for the issue at hand (the specific alarm), meaning that the actions are "large grained". As a consequence sometimes more policies than needed may be triggered which causes unwanted or adverse side effects, which could potentially disturb other services in the network.

There is therefore a need for new and improved solutions for SLA assurance in the art.

SUMMARY

It is therefore an object of the present disclosure to provide a method for operating a telecom network having a Service Level Agreement (SLA), a computer-readable storage medium, and a corresponding system for operating a telecom network having an SLA, which alleviates all or at least some of the above-discussed drawbacks of presently known solutions.

This and other objects are achieved by means of a method, a computer-readable storage medium, and a system as defined in the appended claims. The term exemplary is in the present context to be understood as serving as an instance, example or illustration.

In accordance with an aspect of the present disclosure, there is provided a method for operating a telecom network having an SLA agreement. The method comprises obtaining annotated alarm data comprising an indication of a threshold crossing of at least one state variable of the telecom network defined by the SLA. The annotated alarm data further comprises an indication of a desired value of the at least one state variable of the telecom network. Moreover, the method comprises determining a desired state of the telecom network based on the desired value of at least one state variable, and selecting a set of policy actions from a policy action bank. The policy action bank comprises a plurality of policy actions, where each policy action is associated with at least one estimated action effect. The selection of the set of policy actions is accordingly based on the estimated action effects of the plurality of policy actions and on the determined desired state of the telecom network such that the desired state is reachable upon execution of the selected set of policy actions. The method further comprises sending the selected set of policy actions to an action orchestrating module for execution of the selected set of policy actions.

It was realized by the present inventors that conventional solutions to policy engines map an alarm statically to one or more policy actions. This could be suboptimal, and it handles alarms in an over-simplified fashion, resulting in wrongly provisioning and perhaps execution of unnecessary actions. The proposed solution is capable of modelling each policy action by its effects (and optionally by its pre-conditions), and also to derive a desired state of the network from the raised alarm. These models are then used to derive the set of policy actions in order to optimally satisfy the desired resolution. Additionally the method may include AI aspects and learning from its executions in order to improve the policy engine recommendations.

In accordance with another aspect of the present disclosure there is provided a (non-transitory) computer-readable storage medium storing one or more programs configured to be executed by one or more processors of a network function, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Still further, in accordance with another aspect of the present disclosure, there is provided a system for operating a telecom network having an SLA. The system comprises a policy engine module comprising control circuitry configured to obtain annotated alarm data comprising an indication of a threshold crossing of at least one state variable of the telecom network defined by the SLA. The annotated alarm data further comprises an indication of a desired value of the at least one state variable of the telecom network. The control circuitry is further configured to determine a desired state of the telecom network based on the desired value of the at least one state variable, and select a set of policy actions from a policy action bank. The policy action bank comprises a plurality of policy actions, where each policy action is associated with at least one estimated action effect.

Moreover, the selection of the set of policy actions is based on the estimated action effects of the plurality of policy actions and on the determined desired state of the telecom network such that the desired state is reachable upon execution of the selected set of policy actions. The control circuitry is further configured to send the selected set of policy actions to an action orchestrating module for execution of the selected set of policy actions.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
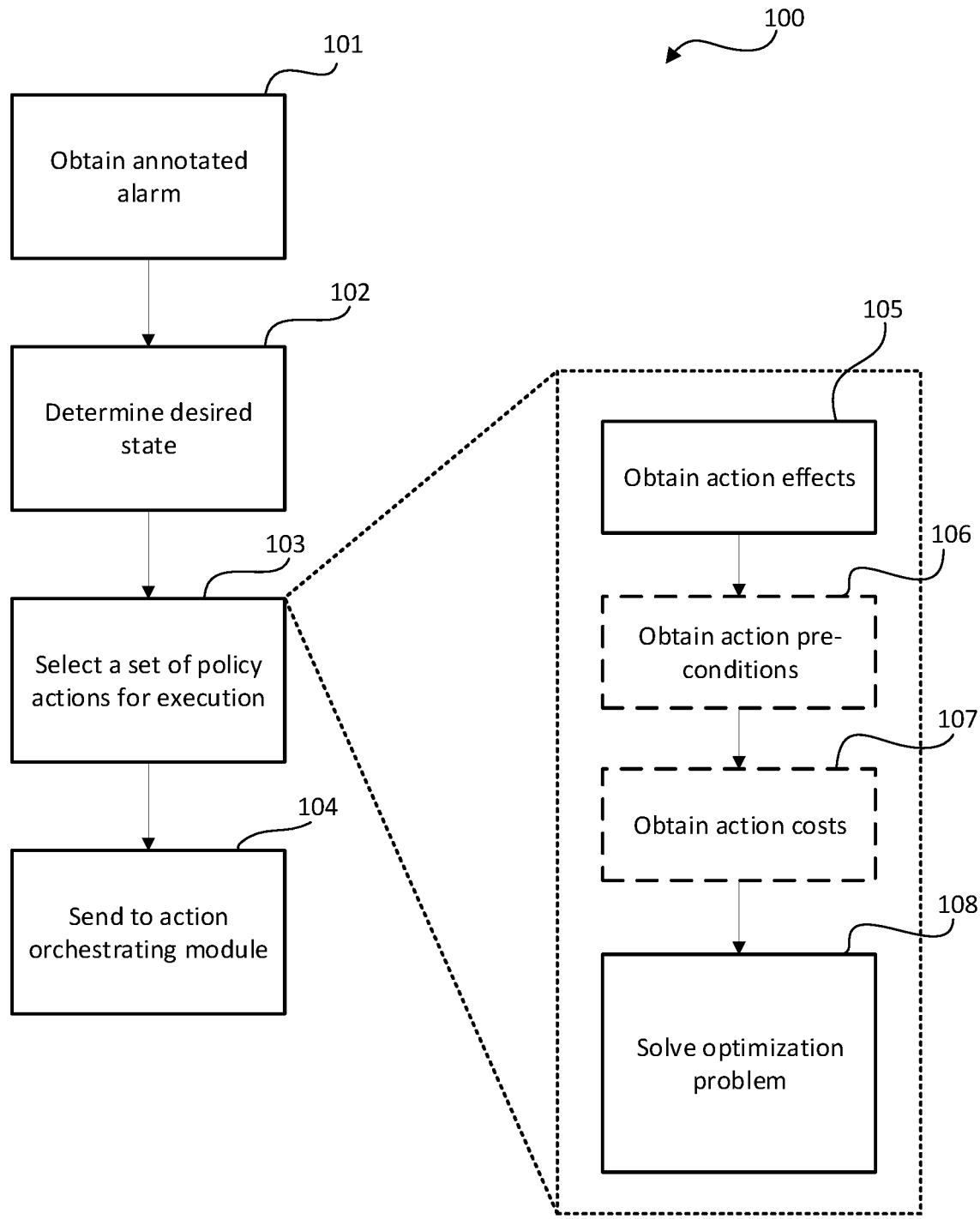
FIG. 1 is schematic flow chart representation of a method for operating a telecom network having a Service Level Agreement (SLA) in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

It should be noted that although terminology from a specific telecom network system such as e.g. 3GPP 5G may be used herein to explain the example embodiments, this should not be seen as limiting the scope of the example embodiments to only the aforementioned system. Other telecom systems, including LTE, WCDMA, WiMax, UMB, GSM, and evolutions in the underlying technologies or standards of the current framework may also benefit from the example embodiments disclosed herein.

In the following description of exemplary embodiments, the same reference numerals denote the same or similar components.

Figure 2:
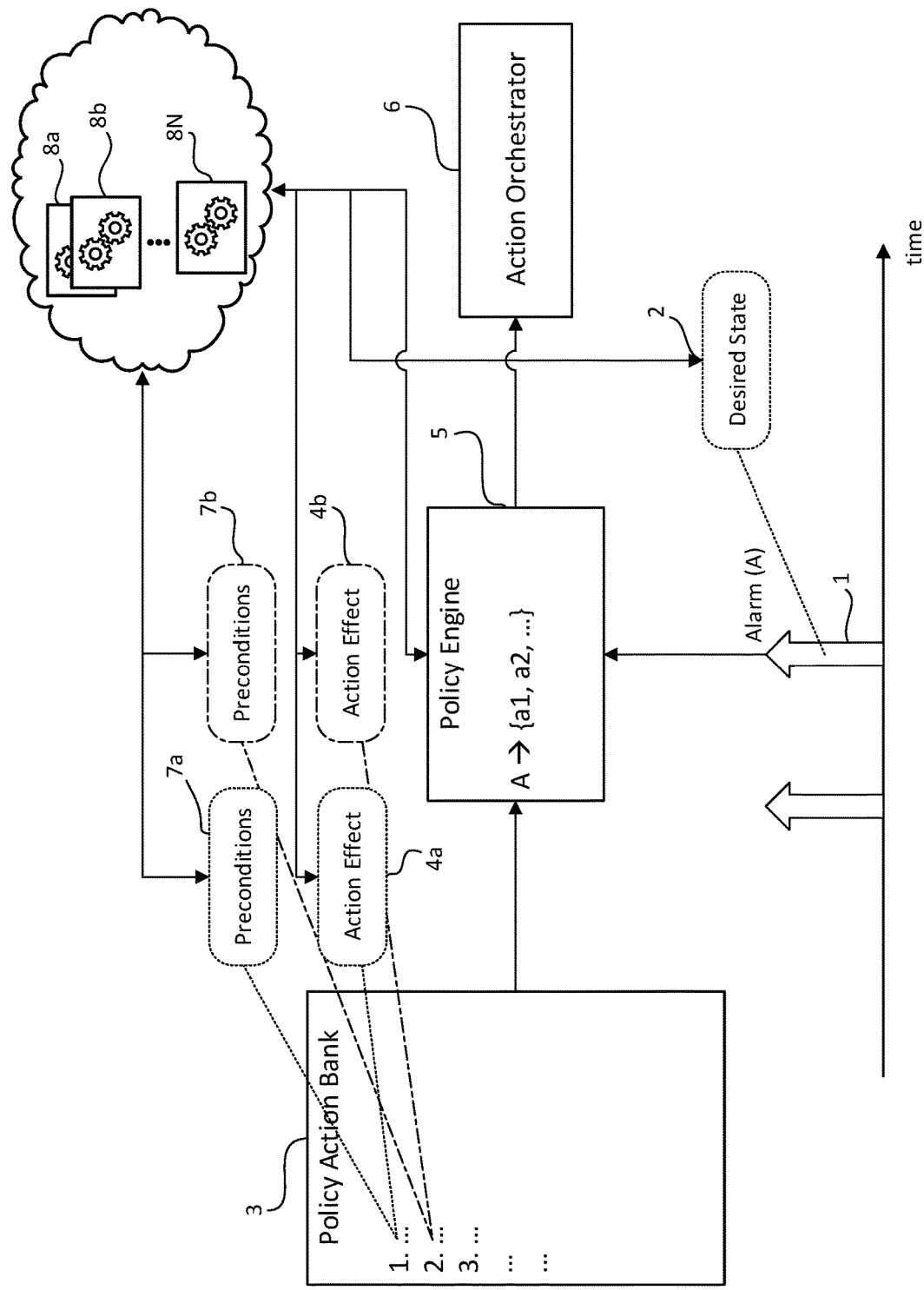
FIG. 2 is a schematic block diagram representation of a method for operating a telecom network having an SLA in accordance with an embodiment of the present disclosure.

The following descriptions will be made in reference to FIG. 1 and FIG. 2, where FIG. 1 shows a flow chart representation of a method 100 for SLA assurance in a telecom environment and FIG. 2 shows a corresponding schematic block diagram.

The method 100 comprises obtaining 101 annotated alarm data 1 that comprises an indication of a threshold crossing of at least one state variable of the telecom network defined by the SLA. In other words, obtaining information indicative of e.g. a failure to provide an agreed-upon service or of an exceeding of resource commitments in the telecom network. The obtained 101 annotated alarm data further comprises an indication of a desired value of the at least one state variable of the telecom network. For example, the obtained 101 annotated alarm data 1 may comprise an indication of a desired value for network latency, availability, throughput, etc. Thus, the annotated alarm data 1 comprises both the alarm (indication that something is wrong) and a desired value of one or more state variables. Moreover, the obtained 101 annotated alarm data 1 may be for a specific network slice (network slices and network slice instances are introduced in 3GPP $5^{th}$ Generation mobile communication technologies). Thus, the raised alarm 1 may relate to some issue in the Radio Access Network (RAN) or in the core network.

Further, the method 100 comprises determining 102 a desired state 2 of the telecom network based on the desired value of at least one state variable. For example, if the obtained 101 alarm data 1 indicates that a certain segment of the telecom network has excessive latency, then the upper limit (threshold) of the latency may be included in the indicated desired value of the latency. The desired value then being any value or a range of values below this upper limit (threshold). This desired value of the latency and possibly further desired values of other state variables together form the desired state 2. The determination 102 of the desired state 2 may be based on a predefined static model, predefined static function or a trained self-learning model 8a-8N such as a trained neural network. The desired state 2 is now used as input to a "policy engine".

Thus, the method 100 further comprises selecting 103 a set of policy actions (set being defined as one or more) from a policy action bank 3. In some embodiments, the selection 103 of policy actions is performed by means of a trained self-learning model 8a-8N, such as e.g. a trained machine learning algorithm, a trained neural network, etc. The policy action bank 3 comprises a plurality of policy actions, where each policy action is associated with one or more estimated action effects 4a, 4b. Analogously as with the desired state determination, the action effects 4a, 4b may be explicitly modelled or learned by means of e.g. a machine-learning algorithm 8a-8N by observing the telecom network over time.

The present inventors realized that alarms 1 themselves are indicators of something gone wrong in the telecom network or network slice. Hence, it was realized that it is possible to derive a more fine-grained description (desired state) defined by the desired value of multiple state variables. Thus, the desired state may be understood as a breakdown of a higher-level broken SLA (indicated by the alarm) to one or more Key Performance Indicators (KPIs) reflected by the desired state. Moreover, the estimated action effects (i.e. the effect of taking an action) may be difficult to completely compute (i.e. to generate an explicit mathematical representation). In such cases it is proposed to provide a self-learning model (e.g. a machine learning algorithm) that is configured to "learn" the effect of actions over time, wherefrom one can abstract this information into the estimated action effects.

Moreover, the selection 103 of the set of policy actions is based on the estimated action effects 4*a*, 4*b* of the plurality of policy actions and on the determined 102 desired state of the telecom network such that the desired state 2 is reached (or at least estimated to be reached by a degree of certainty) upon execution of the selected set of policy actions. In other words, by having the estimated action effect(s) 4*a*, 4*b* and the desired state 2 in place, the job of the proposed policy engine 5 to find the right policy action or group of policy actions whose effect(s) result(s) in the required desired state 2. Thus, the step of selecting 103 the set of policy actions may comprise obtaining 105 the action effects 4*a*, 4*b* of each policy action and then solving 108 an optimization problem in order to determine the most optimal series of actions to be executed in order to reach the desired state.

The method 100 further comprises sending 104 the selected 103 set of policy actions to an action orchestrating module 6 for execution of the selected 103 set of policy actions. Accordingly, the selected policy actions are subsequently executed one by one by the action orchestrating module 6. This method 100 for the policy engine 5 may provide a benefit of the executed policy actions being tailored to the desired state of the system.

Further, each estimated action effect 4*a*, 4*b* may further be associated with one or more cost parameters. Thus, the step of selecting 103 the set of policy actions may further comprise obtaining 106 the cost parameter(s). Accordingly, the aforementioned numerical optimization problem may further be based on these obtained 106 cost parameters. For example, if the selected 103 set of policy actions includes an action of rebooting a virtual machine (VM) in a network slice, the cost of this action may be in terms of the time it takes to do it. Thus, this can be used to guide the optimization. Other cost parameters may for example be a quantified risk parameter, monetary or financial costs associated with an action, and so forth.

Moreover, in some embodiments, each of the plurality of policy actions is further associated with at least one pre-condition 7*a*, 7*b* of the telecom network. Each pre-condition 7*a*, 7*b* defines a predefined parameter value or a predefined parameter range of a state variable of the telecom network. Accordingly, the method 100 may further comprise obtaining a current state of the telecom network, where the current state is defined by current values of a plurality of state variables of the telecom network (e.g. active services, latency values, availability, etc.). The selection 103 of the set of policy actions may further be based on the obtained current state of the telecom network and the obtained 106 pre-conditions 7*a*, 7*b*. In more detail, the current state of the telecom network and the obtained pre-conditions 7*a*, 7*b* may set constraints for the numerical optimization problem that must be fulfilled by the solution.

Stated differently, each policy action can be associated with one or more pre-conditions 7*a*, 7*b*. These pre-conditions 7*a*, 7*b* can then be matched with a current state of the telecom network. The policy engine 5 may accordingly be configured to match pre-conditions 7*a*, 7*b* of the policy actions with the current state of the telecom network so to ensure that only policy actions are executed whose pre-conditions 7*a*, 7*b* are met. Thus, it is now possible to generate or determine pre-conditions 7*a*, 7*b* for the policy actions so that it gates/stops the policy action from being executed when it could potentially adversely affect other traffic or interfere with other actions in place in the telecom network. This makes the policy action execution more robust and sensitive to the dynamics of the telecom network.

In some embodiments, the selectin of policy actions comprises computing a cost function based on the desired state of the telecom network, the estimated action effects 4*a*, 4*b*, the current state of the telecom network, and the pre-conditions 7*a*, 7*b* of the plurality of policy actions. Accordingly, the policy actions whose associated predefined pre-condition(s) 7*a*, 7*b* is/are not fulfilled based on the current state of the telecom network are associated with a higher cost than the policy actions whose associated predefined pre-condition(s) 7*a*, 7*b* is/are fulfilled based on the current state of the telecom network.

The action effect 4*a*, 4*b* of each policy action may be estimated by means of a trained self-learning model 8*a*-8N. This trained self-learning model 8*a*-8N may be the same trained self-learning model 8*a*-8N used for the determination of the desired or an independent (second) trained self-learning model 8*a*-8N. More specifically, the method 100 may further comprise monitoring a state of the telecom network before and after the selected 103 set of policy actions is executed. The state of the telecom network is defined by values of a plurality of the state variables of the telecom network. The raised alarm(s) is/are as mentioned an indication of a threshold crossing of one or more of the state variables.

Further, the method 100 may comprise observing changes of any values of the plurality of state variables while monitoring the state of the telecom network after the selected 103 set of policy actions have been executed. These observed changes can later be defined as estimated action effects 4*a*, 4*b* of one or more of the policy actions of the now executed set of policy actions. Accordingly, the trained self-learning model 8*a*-8N (used to determine the estimated action effects) can be updated based on the observed changes. In other words, if a neural network 8*a*-8N is used to determine the estimated action effects (i.e. to estimate the action effects); the weights of the neural network are updated.

Yet further, in some embodiments, when the selected 103 set of policy actions comprises a plurality of policy actions, the method 100 may comprise obtaining at least one intermediate state of the telecom network. The at least one intermediate state is defined by predicted or expected values of the plurality of state variables of the telecom network during an ordered execution of the selected set of policy actions. Accordingly, the step of selecting 103 the set of policy actions comprises selecting an order of execution of the selected 103 set of policy actions based on the obtained at least one intermediate state. Thus, one can account for the effect that an executed policy action has on the network and how that correlates with the pre-conditions of the subsequent policy actions to be executed. Therefore, the obtained intermediate states may be used to optimally control an order of execution of the selected 103 plurality of policy actions. Thereby, the whole policy action execution procedure is optimized based on "intermediate" states and conditions instead of only initial conditions. For example, even if the pre-conditions of a policy action is or is not fulfilled by the current state of the network, that aspect may change by the execution of one or more other policy actions, rendering the whole SLA assurance method more dynamic and adaptable.

Figure 3:
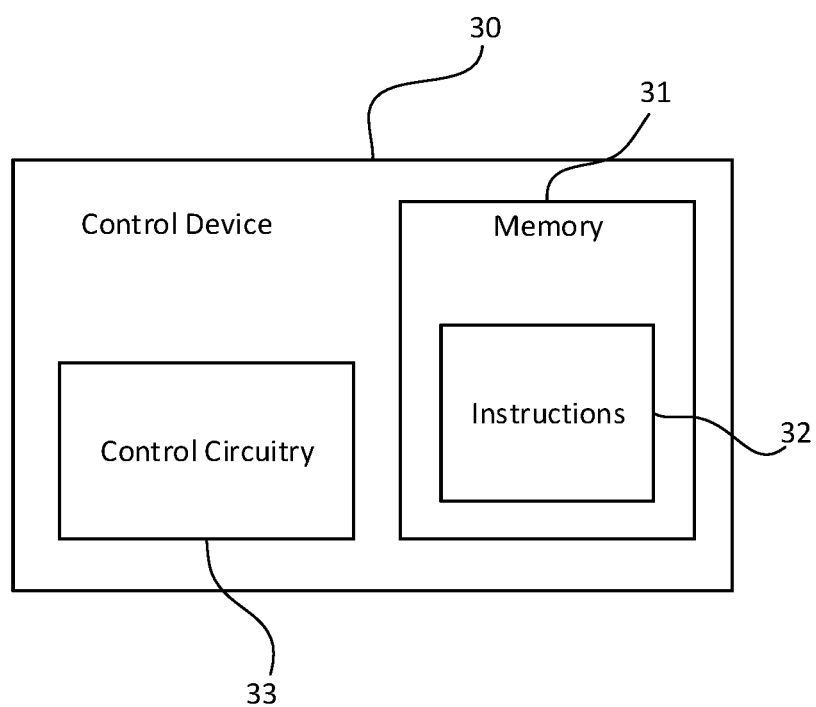
FIG. 3 is a schematic illustration of a control device having a computer-readable storage medium storing one or more programs comprising instructions for performing a method in accordance with an embodiment of the present disclosure.

FIG. 3 shows a schematic illustration of a control device 30 or control module 31 of a network function comprising control circuitry (e.g. one or more processors) configured to execute the instructions 32 stored in the memory 31 so to perform a method according to any one of the embodiments disclosed herein. In other words, executable instructions 32 for performing these functions are, optionally, included in a non-transitory computer-readable storage medium 31 or other computer program product configured for execution by one or more processors 33.

Figure 4:
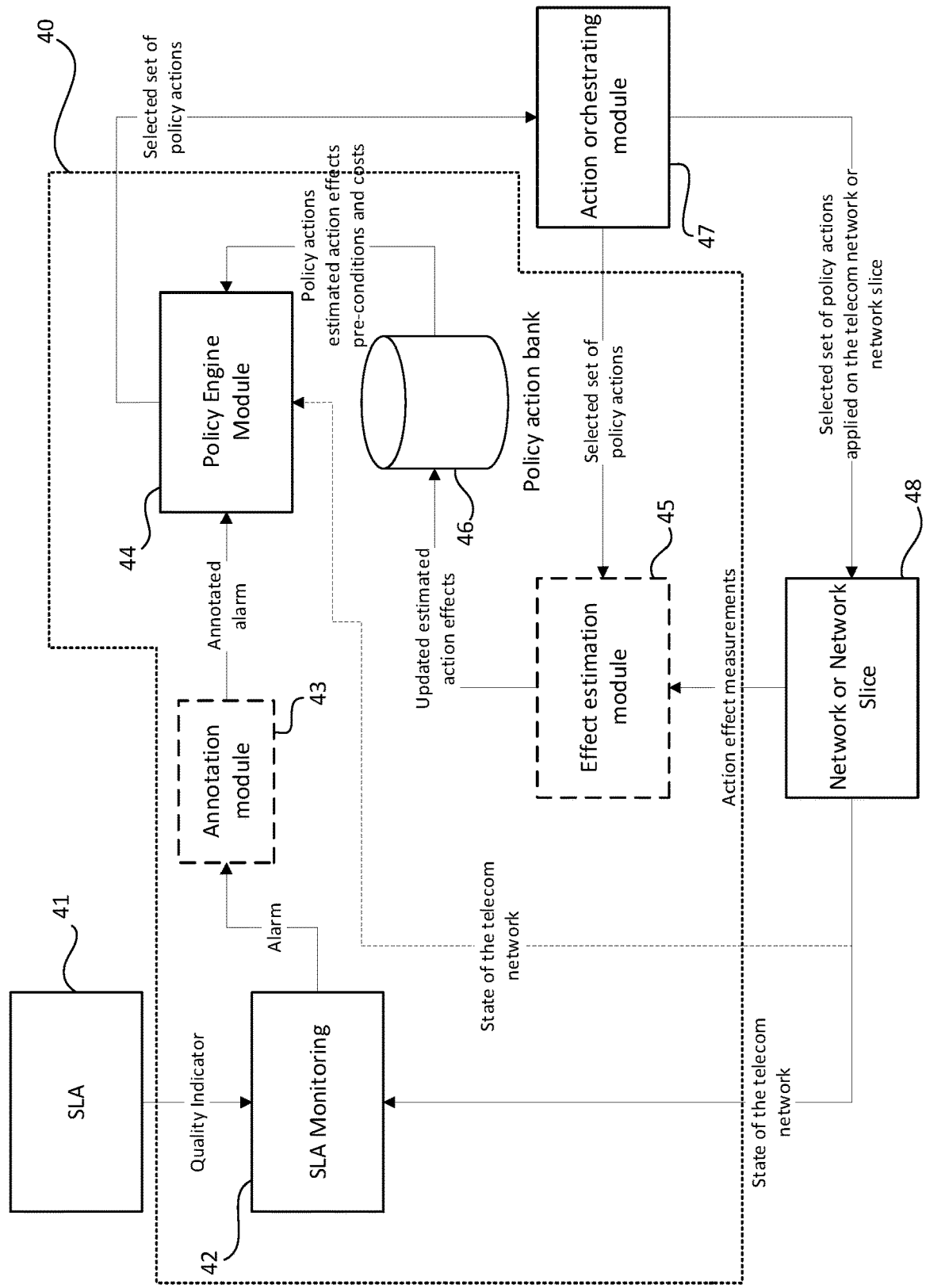
FIG. 4 is a schematic block diagram representation of a system for operating a telecom network having an SLA in accordance with an embodiment of the present disclosure.

FIG. 4 is a schematic block diagram representation of a system 40 for operating a telecom network having a Service Level Agreement (SLA) 41 according to an exemplary embodiment of the present disclosure. The system 40 has a policy engine module 44 comprising control circuitry configured to obtain annotated alarm data comprising an indication of a threshold crossing of one or more state variables of the telecom network or network slice 48 (referred to as network in the following). The thresholds are defined by the SLA 41 of the telecom network 48. The annotated alarm data further comprises an indication of a desired value of the one or more state variables of the telecom network 48. The various modules 42, 43, 44, 45 of the system 40 may for example be realized in accordance with the schematic illustration of the control device/unit of FIG. 3.

The system 40 has an SLA monitoring module 42 having control circuitry configured to obtain a current state of the telecom network 48. The current state is defined by current values (numerical values, strings, or any other suitable format as known in the art) of a plurality of state variables of the telecom network 48. Further, the control circuitry of the SLA monitoring module 42 is configured to obtain a plurality of state variable thresholds (may also be referred to as quality indicator thresholds) as defined by the SLA 41. Each state variable of the plurality of the state variables is associated with one or more state variable thresholds.

Moreover, the SLA monitoring module's control circuitry is configured to form or generate alarm data upon a crossing of a state variable threshold by at least one state variable based on a comparison between the obtained plurality of state variables and the obtained plurality of state variable thresholds. Then, the control circuitry is configured to form the annotated alarm data by associating the formed/generated alarm data with the desired value of the at least one state variable (causing the raised alarm) of the telecom network 48. This annotated alarm data is subsequently sent/provided to the policy engine module 44.

However, optionally, the steps of forming the annotated alarm data and sending the annotated alarm data may be performed by different module, namely an annotation module 43. Accordingly, the annotation module 43 may comprise circuitry configured to obtain alarm data comprising the indication of the threshold crossing (from the SLA monitoring module 42), and to form the annotated alarm data by associating the obtained alarm data with the desired value of the at least one state variable of the telecom network.

In general, an alarm indicating a condition is normally raised by a monitoring system. An "annotated alarm" may in the present context be understood as a raised alarm with metadata indicating a desired effect. For example if the alarm in the general case is about latency increase for a certain network slice, then the annotated alarm would contain additionally a minimum lowering of the latency desired.

Further, one the policy engine module 44 has obtained the annotated alarm data, the control circuitry of the policy engine module 44 is configured to determine a desired state of the telecom network based on the desired value(s) of the at least one state variable. The definition and other details related to the desired state and that terminology has already been discussed in the foregoing with reference to FIGS. 1 and 2, and will therefore for the sake of brevity and conciseness not be further elaborated upon as it is considered to be readily understood by the skilled reader.

In some embodiments, the annotation module may be a part of or integrated with the policy engine module 44 (not shown). Moreover, the annotation module 43 may be configured to determine the desired state of the telecom network 48 based on the desired value(s) of the at least one state variable.

Furthermore, the control circuitry of the policy engine module 44 is configured to select a set (i.e. one or more) of policy actions from a policy action bank 46. The policy action bank 46 comprises a plurality of policy actions, where each policy action is associated with at least one estimated action effect. Accordingly, the selection of the set of policy actions is based on the estimated action effects of the plurality of policy actions and on the determined desired state of the telecom network such that the desired state is reachable upon execution of the selected set of policy actions. The selected set of policy actions are subsequently sent to an action orchestrating module 47 for execution of the selected set of policy actions.

For example in the case of the telecom network being a network slice the set of policy actions may be one or more of: rebooting a specific Virtual Machine (VM), adding a load balancer at a specific location, scaling out a specific service, moving a specific service to a new VM, increasing buffer size, etc.

The estimated action effects of the plurality of policy actions may for example be determined by means of an effect estimation module 45. More specifically, the estimated action effects may be determined by means of an explicit mathematical function/model or by means of a trained self-learning model. In more detail, the effect estimation module 45 comprises control circuitry configured to monitor a state of the telecom network 48 before and after the selected set of policy actions is executed. The state is defined by values (values, strings, etc.) of a plurality of state variables of the telecom network 48 before and after the selected set of policy actions is executed, the state being defined by values of a plurality of state variables of the telecom network. Moreover, the control circuitry of the effect estimation module 45 is configured to observe changes of any values of the plurality of state variables while monitoring the state of the telecom network when the selected set of policy actions have been executed, and to update the trained self-learning model based on the observed changes. However, as mentioned the estimated action effects may also be explicitly modelled and subject to regular updates over time based on aggregated data.

In more detail, each policy action is performed because it provides a certain positive effect. However, some policy actions may have negative effects as well. For example, if the policy action is to reboot a VM, it may potentially have the positive effect that the buffers are cleared up and latency through the VM reduces. It may also have the effect that for a brief period there is a service discontinuity. Such and other effects are determined by the effect estimation module 45.

However, even if it is stated that each policy action has one or more effects, in a complex system such as a telecom network, these effects are not easy to compute/predict. For example, the action of rebooting the VM has a latency decrease effect, but the actual effect may be quite difficult to compute as it is possibly a complex function of the current state of the network slice and the VM, etc. Therefore, it is advantageous to employ some Artificial Intelligence (AI) functionality such as machine learning to observe the effects over repeated instances of the action in order to train the AI function, and to be able to more accurately estimate the effects of various actions in various network states.

The effect estimation module 45 can be said to learn initial effects my merely observing effects of the actions taking into account inventory items (e.g. current state and network topology). Inputs to the effect estimation module 45 comprises the action, topology, and state of the network before the action and the corresponding effect on the network observed after the action was executed.

In one example realization, the effect estimation module 45 may be employed to observe the network with a human operator selecting the set of actions to be executed. This may then be used to initialize e.g. a Reinforcement Learning (RL) model for computing the effects of various actions. Thus, over time the effect estimation module 45 learns by observing relationships of the input and the output to provide a better effect estimate for each policy action (e.g. by updating the Reinforcement Learning or Machine Learning model).

Moreover, in some embodiments, each of the plurality of policy actions held by the policy action bank 46 is further associated with at least one pre-condition of the telecom network 48. More specifically, each pre-condition defines a predefined parameter value or a predefined parameter range of a state variable of the telecom network 48. Accordingly, the control circuitry of the policy engine module 44 is further configured to obtain a current state of the telecom network 48, the current state being defined by a current values of a plurality of state variables of the telecom network 48. Thereby, the selection of the set of policy actions is further based on the obtained current state of the telecom network 48 and the obtained pre-conditions.

Stated differently, each of the above mentioned policy actions may be annotated with preconditions that are required to hold before the policy action is performed. These may cover safety considerations or necessary pre-configurations that constrain under what states (of the telecom network 48) the action may be allowed to be performed. If for example the policy action is "rebooting a specific VM", the pre-condition may be that it may only be performed/executed provided that it is not serving another slice. In another example embodiment, a pre-condition may be that all other slices sharing this VM are not latency critical.

Still further, the control circuitry of the policy engine module 44 may be further configured to compute a cost function based on the desired state of the telecom network 48, the estimated action effects of the plurality of policy actions, the current state of the telecom network, and the pre-conditions of the plurality of policy actions. The policy actions whose actions whose associated predefined pre-condition(s) is/are not fulfilled based on the current state of the telecom network are associated with a higher cost than the policy actions whose associated predefined pre-condition(s) is/are fulfilled based on the current state of the telecom network.

In a 5G system, the high-level service level agreements (SLAs) are converted into low level quality indicators (state variable thresholds). In such systems, the low-level quality indicators could be throughput, latency, availability, etc. A network management entity (e.g. SLA monitoring module) could typically monitor the state of the telecom network and when a particular quality indicator (state variable) goes "bad", an alarm may be raised by the network management entity which could trigger an action that is emanated from the current network state and policy rules as described in the foregoing.

In one exemplary embodiment, the state variable could be the bitrate for a video rendering service. For example, if an end-user is watching a video with certain quality assurance guaranteed to the client in the SLA. This can be monitored using a state variable such as throughput in the downlink transmission for the video service-type to the client. When this is not met, then an alarm is raised by the SLA monitoring module in the network management system. Based on the state of the network, a policy rule directing sequence of actions is initiated. If for example, the state of the network is such that there is sufficient additional radio resources (e.g. more sub-carrier/time allocations in the lower level) available, then the policy rule will trigger an action resulting of providing more resources to the video rendering network slice to meet the SLA.

In another exemplary embodiment, one can consider availability (for example, 99% availability) of a service such as billing information to clients in a telecom network as a state variable. Thus, when the SLA monitoring module generates an alarm, e.g. because the state of the telecom network is such that billing server cannot be reached then the policy engine module may trigger a reboot of that particular server. In both of the above described embodiments, the effect of the action is captured directly to address the cause of the SLA violation.

In summary, the above proposed method and system one can determine a set of actions for execution that is far more well-tailored (than previously known) to meet the requirements to achieve the desired SLA with reduced negative side effects. This may form the basis for a more robust closed-loop operation to maintain SLAs.

In more detail, the trigger to the whole sequence of process steps is an annotated alarm generated by the SLA monitoring module 42. Then, the desired state, estimated effects, policy action pre-conditions, and policy action cost parameters, are used by or provided as input to the policy engine module 44. The policy engine module "makes" a decision (selects a set of policy actions for execution) using any standard optimization technique such as e.g. AI planning to arrive at one or more actions in an ordered sequence that gives the desired state. Thus, the selection of the set of policy actions is goal driven and actively uses the estimated effects to select a cost optimal sequence of actions. For example, a cost parameter may be the expected time of the action. In that case, the optimal action sequence is one that takes minimum amount of time, and still reaches the desired state. The set of policy actions (action sequence) is then set to an orchestrator 47 that executes the actions on the network/network slice 48. The result of the execution are monitored against the SLAs 41 and if needed a new alarm is generated at a future time, closing the loop.

Furthermore, as mentioned in the foregoing, the conventional approach is to use policies that are statically defined. An example from the ONAP (Open Network Automation Platform) policy framework is shown in the table below.

| Policy Name | Deployment strategy |
| --- | --- |
| Slice-Type-1 | At least 4 hosts, scale up on 70% load, scale down on 40% load |
| Slice-Type-2 | At least 3 hosts, scale up on 70% load, scale down on 30% load |

Such a rule-based approach relies heavily on a network expert's knowledge of the deployed network. Moreover, the effects of such policies are not expressed nor even contemplated. Thus, such rule-based knowledge is hard to extend to other networks. In particular, for 5G slices, it may be difficult to employ such static policies in order to dynamically ensure that slice SLAs are met. Instead, in the proposed approach, the policy actions are planned in a more elaborate manner based on their effects on the network.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, one or more of the modules of the system 40 may be combined and realized as a single module or entity. In other words, the functions of one or more of the modules may be integrated into other modules. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for operating a telecom network having a Service Level Agreement (SLA), the method comprising:
   obtaining annotated alarm data comprising an indication of a threshold crossing of at least one state variable of the telecom network defined by the SLA, the annotated alarm data further comprising an indication of a desired value of the at least one state variable of the telecom network;
   determining a desired state of the telecom network based on the desired value of at least one state variable;
   selecting a set of policy actions from a policy action bank, wherein the policy action bank comprises a plurality of policy actions, each policy action being associated with at least one estimated action effect, and wherein the selection of the set of policy actions is based on the estimated action effects of the plurality of policy actions and on the determined desired state of the telecom network such that the desired state is reachable upon execution of the selected set of policy actions; and
   sending the selected set of policy actions to an action orchestrating module for execution of the selected set of policy actions;
   wherein each of the plurality of policy actions is further associated with at least one pre-condition of the telecom network, each pre-condition defining a predefined parameter value or a predefined parameter range of a state variable of the telecom network; and
   wherein the method further comprises:
      obtaining a current state of the telecom network, the current state being defined by current values of a plurality of state variables of the telecom network, and wherein the selection of the set of policy actions is further based on the obtained current state of the telecom network and the pre-conditions; and
      wherein the selection of the set of policy actions comprises:
         computing a cost function based on the desired state of the telecom network, the estimated action effects of the plurality of policy actions, the current state of the telecom network, and the pre-conditions of the plurality of policy actions;
         wherein the policy actions whose associated predefined pre-condition(s) is/are not fulfilled based on the current state of the telecom network are associated with a higher cost than the policy actions whose associated predefined pre-condition(s) is/are fulfilled based on the current state of the telecom network.

2. A method for operating a telecom network having a Service Level Agreement (SLA), the method comprising:
   obtaining annotated alarm data comprising an indication of a threshold crossing of at least one state variable of the telecom network defined by the SLA, the annotated alarm data further comprising an indication of a desired value of the at least one state variable of the telecom network;
   determining a desired state of the telecom network based on the desired value of at least one state variable;

selecting a set of policy actions from a policy action bank, wherein the policy action bank comprises a plurality of policy actions, each policy action being associated with at least one estimated action effect, and wherein the selection of the set of policy actions is based on the estimated action effects of the plurality of policy actions and on the determined desired state of the telecom network such that the desired state is reachable upon execution of the selected set of policy actions; and sending the selected set of policy actions to an action orchestrating module for execution of the selected set of policy actions;

wherein each of the plurality of policy actions is further associated with at least one pre-condition of the telecom network, each pre-condition defining a predefined parameter value or a predefined parameter range of a state variable of the telecom network; and wherein the method further comprises:

obtaining a current state of the telecom network, the current state being defined by current values of a plurality of state variables of the telecom network, and wherein the selection of the set of policy actions is further based on the obtained current state of the telecom network and the pre-conditions; and wherein the selection of the set of policy actions are configured such that only policy actions from the policy action bank are selected whose associated predefined pre-condition(s) is/are fulfilled based on the current state of the telecom network.

3. A method for operating a telecom network having a Service Level Agreement (SLA), the method comprising:

obtaining annotated alarm data comprising an indication of a threshold crossing of at least one state variable of the telecom network defined by the SLA, the annotated alarm data further comprising an indication of a desired value of the at least one state variable of the telecom network;

determining a desired state of the telecom network based on the desired value of at least one state variable;

selecting a set of policy actions from a policy action bank, wherein the policy action bank comprises a plurality of policy actions, each policy action being associated with at least one estimated action effect, and wherein the selection of the set of policy actions is based on the estimated action effects of the plurality of policy actions and on the determined desired state of the telecom network such that the desired state is reachable upon execution of the selected set of policy actions; and sending the selected set of policy actions to an action orchestrating module for execution of the selected set of policy actions;

wherein each of the plurality of policy actions is further associated with at least one pre-condition of the telecom network, each pre-condition defining a predefined parameter value or a predefined parameter range of a state variable of the telecom network; and wherein the method further comprises:

obtaining a current state of the telecom network, the current state being defined by current values of a plurality of state variables of the telecom network, and wherein the selection of the set of policy actions is further based on the obtained current state of the telecom network and the pre-conditions; and wherein the selected set of policy actions comprises a plurality of policy actions, the method further comprising:

obtaining at least one intermediate state of the telecom network, the at least one intermediate state being defined by predicted values of the plurality of state variables of the telecom network during an ordered execution of the selected set of policy actions;

wherein selecting the set of policy actions comprises selecting an order of execution of the selected set of policy actions based on the obtained at least one intermediate state.

4. A system for operating a telecom network having a Service Level Agreement, SLA, the system comprising:

a policy engine module comprising control circuitry configured to:

obtain annotated alarm data comprising an indication of a threshold crossing of at least one state variable of the telecom network defined by the SLA, the annotated alarm data further comprising an indication of a desired value of the at least one state variable of the telecom network;

determine a desired state of the telecom network based on the desired value of the at least one state variable;

select a set of policy actions from a policy action bank, wherein the policy action bank comprises a plurality of policy actions, each policy action being associated with at least one estimated action effect, and wherein the selection of the set of policy actions is based on the estimated action effects of the plurality of policy actions and on the determined desired state of the telecom network such that the desired state is reachable upon execution of the selected set of policy actions; and send the selected set of policy actions to an action orchestrating module for execution of the selected set of policy actions; and wherein the system further comprises an SLA monitoring module comprising control circuitry configured to:

obtain a current state of the telecom network, the current state being defined by current values of a plurality of state variables of the telecom network;

obtain a plurality of state variable thresholds, wherein each state variable of the plurality of state variables is associated with at least one state variable threshold;

form alarm data upon a crossing of a threshold of at least one state variable based on a comparison between the obtained plurality of state variables and the obtained plurality of state variable thresholds;

form the annotated alarm data by associating the formed alarm data with the desired value of at least one state variable of the telecom network; and send the annotated alarm data to the policy engine module.

5. A system for operating a telecom network having a Service Level Agreement, SLA, the system comprising:

a policy engine module comprising control circuitry configured to:

obtain annotated alarm data comprising an indication of a threshold crossing of at least one state variable of the telecom network defined by the SLA, the annotated alarm data further comprising an indication of a desired value of the at least one state variable of the telecom network;

determine a desired state of the telecom network based on the desired value of the at least one state variable;

select a set of policy actions from a policy action bank, wherein the policy action bank comprises a plurality of policy actions, each policy action being associated with at least one estimated action effect, and wherein the selection of the set of policy actions is based on the estimated action effects of the plurality of policy actions and on the determined desired state of the telecom network such that the desired state is reachable upon execution of the selected set of policy actions; and send the selected set of policy actions to an action orchestrating module for execution of the selected set of policy actions;

wherein each of the plurality of policy actions is further associated with at least one pre-condition of the telecom network, each pre-condition defining a predefined parameter value or a predefined parameter range of a state variable of the telecom network, wherein the control circuitry of the policy engine module is further configured to:

obtain a current state of the telecom network, the current state being defined by a current values of a plurality of state variables of the telecom network; and wherein the selection of the set of policy actions is further based on the obtained current state of the telecom network and the pre-conditions.

6. The system according to claim 5, wherein the control circuitry of the policy engine module is further configured to:

compute a cost function based on the desired state of the telecom network, the estimated action effects of the plurality of policy actions, the current state of the telecom network, and the pre-conditions of the plurality of policy actions;

wherein the policy actions whose associated predefined pre-condition(s) is/are not fulfilled based on the current state of the telecom network are associated with a higher cost than the policy actions whose associated predefined pre-condition(s) is/are fulfilled based on the current state of the telecom network.

\* \* \* \* \*